US008620116B2

(12) United States Patent
Uesaka et al.

(10) Patent No.: US 8,620,116 B2
(45) Date of Patent: Dec. 31, 2013

(54) OPTICAL MODULATION APPARATUS, METHOD FOR CONTROLLING OPTICAL MODULATION APPARATUS

(75) Inventors: Katsumi Uesaka, Kanagawa (JP); Tohru Watanabe, Kanagawa (JP)

(73) Assignee: Sumitomo Electric Industries, Ltd., Osaka (JP)

(*) Notice: Subject to any disclaimer, the term of this patent is extended or adjusted under 35 U.S.C. 154(b) by 194 days.

(21) Appl. No.: 13/346,032

(22) Filed: Jan. 9, 2012

(65) Prior Publication Data

US 2013/0136388 A1    May 30, 2013

(30) Foreign Application Priority Data

Nov. 25, 2011    (JP) .................................. 2011-257907

(51) Int. Cl.
*G02F 1/01* (2006.01)
*G02F 1/035* (2006.01)

(52) U.S. Cl.
USPC ........................................ 385/3; 385/1; 385/2

(58) Field of Classification Search
USPC .............................................................. 385/3
See application file for complete search history.

(56) References Cited

U.S. PATENT DOCUMENTS

| | | | |
|---|---|---|---|
| 8,467,635 B2 * | 6/2013 | Doi et al. ........................... | 385/2 |
| 2002/0003648 A1 * | 1/2002 | Kobayashi et al. ............ | 359/180 |
| 2004/0052441 A1 * | 3/2004 | Doerr ................................ | 385/3 |
| 2011/0229070 A1 * | 9/2011 | Doi et al. ........................... | 385/3 |
| 2012/0134619 A1 * | 5/2012 | Seki et al. .......................... | 385/3 |
| 2012/0134620 A1 * | 5/2012 | Yamaji et al. ..................... | 385/3 |
| 2013/0136388 A1 * | 5/2013 | Uesaka et al. ..................... | 385/3 |

OTHER PUBLICATIONS

Li, G.L. et al., "Optical Intensity Modulators for Digital and Analog applications.", Journal of Lightwave Technology, Sep. 2003, pp. 2010-2030, vol. 21, No. 9.

* cited by examiner

*Primary Examiner* — Rhonda Peace
(74) *Attorney, Agent, or Firm* — Westerman, Hattori, Daniels & Adrian, LLP

(57) ABSTRACT

An optical modulation apparatus, including: a Mach-Zehnder optical modulator having two light waveguides, two output light waveguides, and a join-and-branch portion located therebetween; a drive circuit configured to output a modulation signal to modulation electrodes provided respectively on the two light waveguides as a differential signal, the modulation signal modulating lights propagated in the two light waveguides; a phase adjustment circuit configured to control first phase control signals to be output to phase adjustment electrodes provided respectively on the two light waveguides, and adjust phases of lights propagated in the two light waveguides; a phase shift control circuit configured to switch second phase control signals to be output to phase shift electrodes provided respectively on the two light waveguides, and change phases of the lights propagated in the two light waveguides; and a signal polarity reversal circuit configured to reverse a polarity of the differential signal.

12 Claims, 13 Drawing Sheets

FIRST EMBODIMENT

TIME [nsec]

TIME [nsec]

TIME [nsec]

TIME [nsec]

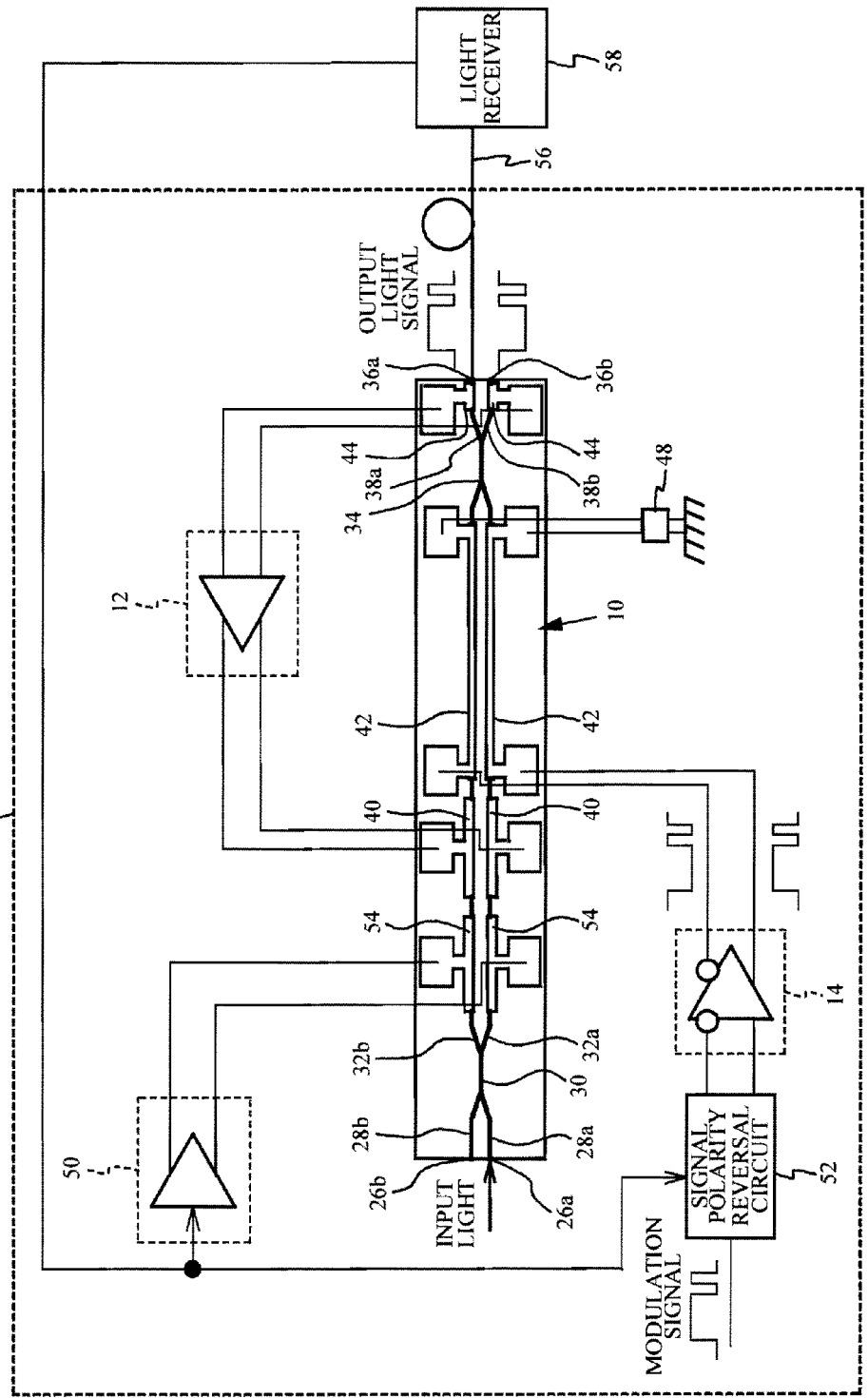

TIME [nsec]

TIME [nsec]

TIME [nsec]

TIME [nsec]

OPTICAL MODULATION APPARATUS, METHOD FOR CONTROLLING OPTICAL MODULATION APPARATUS

CROSS-REFERENCE TO RELATED APPLICATION

This application is based upon and claims the benefit of priority of the prior Japanese Patent Application No. 2011-257907, filed on Nov. 25, 2011, the entire contents of which are incorporated herein by reference.

BACKGROUND (i) Technical Field

A certain aspect of the embodiments discussed herein is related to an optical modulation apparatus and a method for controlling an optical modulation apparatus.

(ii) Related Art

In an optical communication system that superimposes a signal on a light and transmits the light with an optical fiber, an optical modulator that modulates the intensity of a laser light emitted from a light source, and generates an optical signal is used. For example, a Mach-Zehnder optical modulator is widely known as the optical modulator.

The Mach-Zehnder optical modulator has a waveguide structure including a branch potion that branches an input light, two light waveguides that propagate the branched lights, and a multiplex portion that multiplexes the lights propagated through the light waveguides again. The Mach-Zehnder optical modulator is the optical modulator that turns on or off the light according to an interference condition at the time of multiplexing the lights.

In the Mach-Zehnder optical modulator, a technique that inputs a differential signal as a modulation signal to two light waveguides to perform a zero-chirp operation is known (see G. L. Li and P. K. L. Yu, "Optical Intensity Modulators for Digital and Analog Applications", J. of Lightwave Technology, Vol. 21, pp 2010-2030, 2003).

SUMMARY

Even when the differential signal as the modulation signal is input to the two light waveguides, as described in the "Optical Intensity Modulators for Digital and Analog Applications", a change of the phase to a modulation voltage applied to the two light waveguide is not linear if a semiconductor is used as material of the modulator. The waveform distortion by fiber dispersion may become asymmetrical by the nonlinearity at a positive dispersion side and a negative dispersion side. In this case, a dispersion penalty of the positive dispersion side may differ in size from that of the negative dispersion side, and any one of the dispersion penalties may be larger than another one.

It is an object of the present invention to provide an optical modulation apparatus and a method for controlling the optical modulation apparatus that can reduce the dispersion penalty.

According to an aspect of the present invention, there is provided an optical modulation apparatus, including: a Mach-Zehnder optical modulator having two light waveguides, two output light waveguides, and a join-and-branch portion located therebetween; a drive circuit configured to output a modulation signal to modulation electrodes provided respectively on the two light waveguides as a differential signal, the modulation signal modulating lights propagated in the two light waveguides; a phase adjustment circuit configured to control first phase control signals to be output to phase adjustment electrodes provided respectively on the two light waveguides, and adjust phases of lights propagated in the two light waveguides; a phase shift control circuit configured to switch second phase control signals to be output to phase shift electrodes provided respectively on the two light waveguides, and change phases of the lights propagated in the two light waveguides; and a signal polarity reversal circuit configured to reverse a polarity of the differential signal.

BRIEF DESCRIPTION OF THE DRAWINGS

FIG. 7 is a schematic top view of the optical modulation apparatus according to a first embodiment;

DETAILED DESCRIPTION

Figure 1:
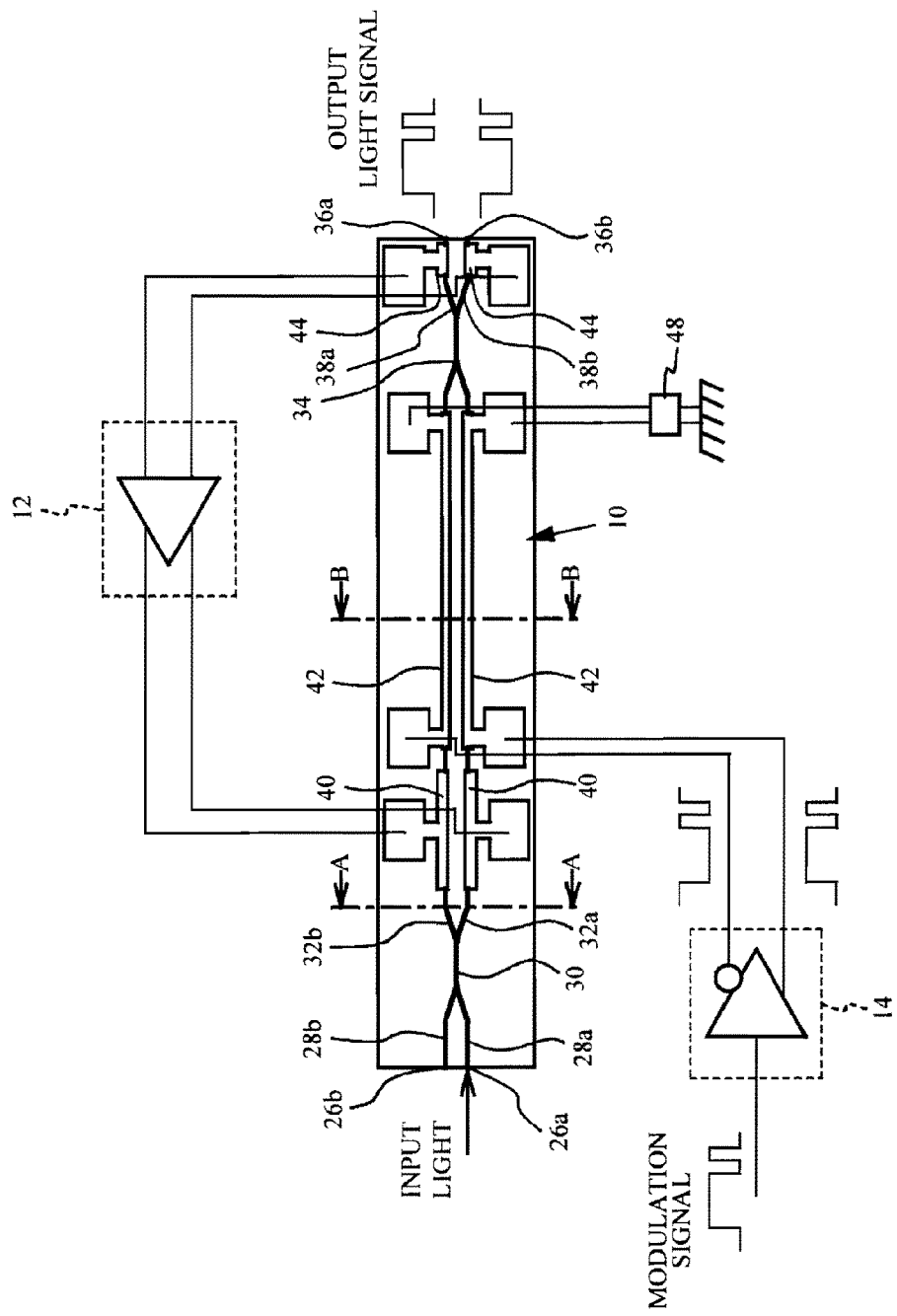
FIG. 1 is a schematic top view of an optical modulation apparatus according to a comparative example 1.

First, a description will be given of an optical modulation apparatus according to a comparative example 1. FIG. 1 is a schematic top view of the optical modulation apparatus according to the comparative example 1. As illustrated in FIG. 1, the optical modulation apparatus according to the comparative example 1 mainly includes a Mach-Zehnder optical modulator 10, a phase adjustment circuit 12, and a drive circuit 14.

Figure 2A:
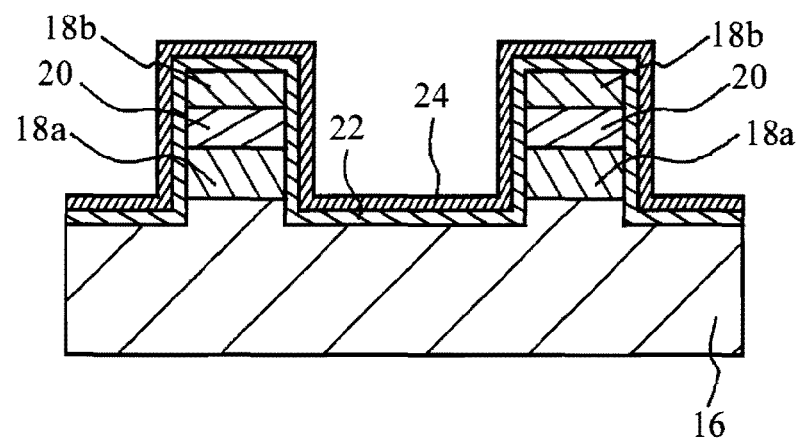
FIG. 2A is a schematic cross-sectional diagram taken along a line A-A depicted in FIG. 1.
Figure 2B:
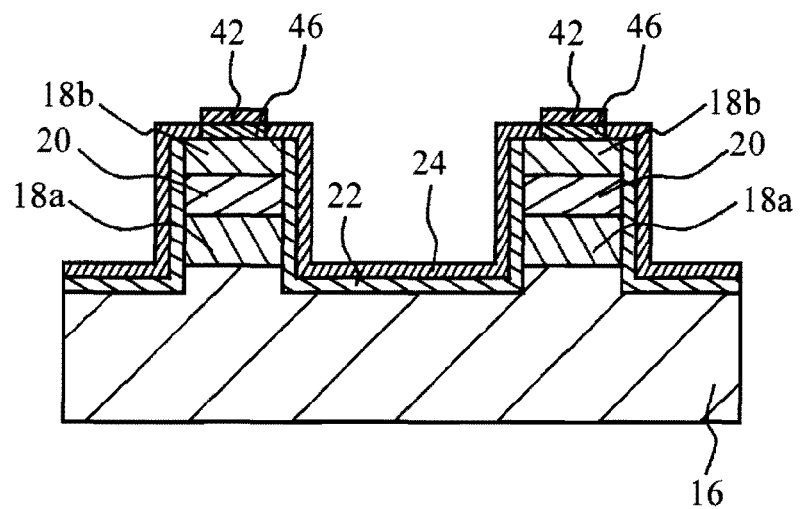
FIG. 2B is a schematic cross-sectional diagram taken along a line B-B depicted in FIG. 1.

The Mach-Zehnder optical modulator 10 is configured by combining routes of mesa-shaped light waveguides on a semiconductor substrate. FIG. 2A is a schematic cross-sectional diagram taken along a line A-A depicted in FIG. 1, and FIG. 2B is a schematic cross-sectional diagram taken along a line B-B depicted in FIG. 1.

As illustrated in FIG. 2A, the light waveguides are formed on a semiconductor substrate 16. Each waveguide has a structure in which a lower cladding layer 18a, a core 20, and a upper cladding layer 18b are laminated in a mesa shape on the semiconductor substrate 16 in this order. A passivation film 22 and an insulating film 24 are laminated on an upper surface of the semiconductor substrate 16 and an upper surface and side surfaces of each waveguide in this order.

The semiconductor substrate 16 is made of a semiconductor such as InP, for example. The lower cladding layer 18a and the upper cladding layer 18b are made of a semiconductor such as InP, for example. The core 20 is made of a semiconductor, such as InGaAsP for example, having band-gap energy smaller than the lower cladding layer 18a and the upper cladding layer 18b. Thereby, the light passing through the core 20 is confined with the lower cladding layer 18a and the upper cladding layer 18b. The passivation film 22 is made of a semiconductor such as InP, for example. The insulating film 24 is made of a semiconductor such as SiN, for example.

As illustrated in FIG. 1, a first input light waveguide 28a connected to a first input end 26a, and a second input light waveguide 28b connected to a second input end 26b are provided in the Mach-Zehnder optical modulator 10. The first input light waveguide 28a and the second input light waveguide 28b join together at a first MMI (Multi Mode Interference) 30, and branch to a first light waveguide 32a and a second light waveguide 32b. When a longitudinal direction of the Mach-Zehnder optical modulator 10 is assumed as an axis of symmetry, the first light waveguide 32a is arranged at the same side as the first input end 26a, and the second light waveguide 32b is arranged at the same side as the second input end 26b.

The first light waveguide 32a and the second light waveguide 32b join together at a second MMI 34 serving as a join-and-branch portion, and branch to a first output light waveguide 38a connected to a first output end 36a and a second output light waveguide 38b connected to a second output end 36b. In a 2×2 type MMI, the phase difference of π/2 occurs between a bar side (i.e., a direct advance side) and a cross side (i.e., an oblique motion side). For example, when the light input from the first input end 26a is branched to the first light waveguide 32a and the second light waveguide 32b by the first MMI 30, the light branched to the first light waveguide 32a has the phase difference of π/2 to the light branched to the second light waveguide 32b. When the longitudinal direction of the Mach-Zehnder optical modulator 10 is assumed as the axis of symmetry, the first output end 36a is arranged at the same side as the second light waveguide 32b, and the second output end 36b is arranged at the same side as the first light waveguide 32a. Between a light path length of the first light waveguide 32a and a light path length of the second light waveguide 32b, a difference is provided beforehand. For example, a light-path-length difference that adds the phase difference of −π/2 to the lights propagated in the first light waveguide 32a and the second light waveguide 32b is provided. That is, a phase shift that adds the phase difference of −π/2 to the lights propagated in the first light waveguide 32a and the second light waveguide 32b is provided in the first light waveguide 32a.

Each of phase adjustment electrodes 40 and each of modulation electrodes 42 are provided on each of the first light waveguide 32a and the second light waveguide 32b. The phase adjustment electrode 40 and the modulation electrode 42 are separated from each other. The positions of the phase adjustment electrode 40 and the modulation electrode 42 are not specially limited to FIG. 1, but in the present embodiment, the phase adjustment electrode 40 is arranged near the light input end, compared to the modulation electrode 42. Light intensity detection electrodes 44 for detecting the intensity of the lights propagated in the first output light waveguide 38a and the second output light waveguide 38b are provided on the first output light waveguide 38a and the second output light waveguide 38b, respectively.

As illustrated in FIG. 2S, each of the modulation electrodes 42 is arranged on the upper cladding layer 18b via a contact layer 46. The contact layer 46 is made of a semiconductor such as InGaAs, for example. The passivation film 22 and the insulating film 24 are not provided between the upper cladding layer 18b and the contact layer 46. Similarly, the phase adjustment electrode 40 and the light intensity detection electrode 44 are also arranged on the upper cladding layer 18b via the contact layer 46. The phase adjustment electrode 40, the modulation electrode 42 and the light intensity detection electrode 44 are made of metal such as Au, for example.

Referring again to FIG. 1, a modulation voltage for modulating the lights propagated in the first light waveguide 32a and the second light waveguide 32b is applied to one end of each modulation electrode 42 with the drive circuit 14. A DC (Direct Current) bias voltage of a reverse bias is applied to the modulation voltage to be applied to each modulation electrode 42. A terminating resistance 48 is connected to another end of each modulation electrode 42. When the modulation voltage is applied to each modulation electrode 42, a refractive index of the core 20 changes in the first light waveguide 32a and the second light waveguide 32b, and the phases of the lights passing through the first light waveguide 32a and the second light waveguide 32b change.

The drive circuit 14 inputs a differential signal as a modulation signal to the modulation electrode 42 provided on the first light waveguide 32a and the modulation electrode 42 provided on the second light waveguide 32b. That is, when a voltage for driving at H (high) is applied to the modulation electrode 42 of the first light waveguide 32a, a voltage for driving at L (low) is applied to the modulation electrode 42 of the second light waveguide 32b. On the contrary, when the voltage for driving at L (low) is applied to the modulation electrode 42 of the first light waveguide 32a, the voltage for driving at H (high) is applied to the modulation electrode 42 of the second light waveguide 32b. Thus, since a difference in potential exists between the voltages applied to the modulation electrode 42 of the first light waveguide 32a and the modulation electrode 42 of the second light waveguide 32b, the phase difference according to the difference in potential is added to the lights propagated in the first light waveguide 32a and the second light waveguide 32b.

For example, when the voltage for driving at H (high) is applied to the modulation electrode 42 of the first light waveguide 32a and the voltage for driving at L (low) is applied to the modulation electrode 42 of the second light waveguide 32b, the phase difference of $+\pi/2$ is added to the lights propagated in the first light waveguide 32a and the second light waveguide 32b. In addition, for example, when the voltage for driving at L (low) is applied to the modulation electrode 42 of the first light waveguide 32a and the voltage for driving at H (high) is applied to the modulation electrode 42 of the second light waveguide 32b, the phase difference of $-\pi/2$ is added to the lights propagated in the first light waveguide 32a and the second light waveguide 32b.

As described above, the phase shift that adds the phase difference of $-\pi/2$ to the lights propagated in the first light waveguide 32a and the second light waveguide 32b is provided in the first light waveguide 32a in advance. Therefore, when the voltage for driving at H (high) is applied to the modulation electrode 42 of the first light waveguide 32a and the voltage for driving at L (low) is applied to the modulation electrode 42 of the second light waveguide 32b, the phase difference between the lights having passed through the first light waveguide 32a and the second light waveguide 32b is $+\pi/2$. On the contrary, when the voltage for driving at L (low) is applied to the modulation electrode 42 of the first light waveguide 32a and the voltage for driving at H (high) is applied to the modulation electrode 42 of the second light waveguide 32b, the phase difference between the lights having passed through the first light waveguide 32a and the second light waveguide 32b is $-\pi/2$. Thus, when the modulation voltage is applied to each modulation electrode 42 as the differential signal, the phase difference between the lights having passed through the first light waveguide 32a and the second light waveguide 32b alternately repeats $+\pi/2$ and $-\pi/2$.

When the phase difference between the lights having passed through the first light waveguide 32a and the second light waveguide 32b is $+\pi/2$, the output phases of the second MMI 34 are same phases, and hence the light input from the first input end 26a is output from the first output end 36a and is not output from the second output end 36b. On the contrary, when the phase difference between the lights having passed through the first light waveguide 32a and the second light waveguide 32b is $-\pi/2$, the output phases of the second MMI 34 are reversed phases, and hence the light input from the first input end 26a is output from the second output end 36b and is not output from the first output end 36a. Thus, the output end from which the light input from the first input end 26a is output is switched between the first output end 36a and the second output end 36b, according to the phase difference between the lights having passed through the first light waveguide 32a and the second light waveguide 32b. Thereby, an output light signal from the first output end 36a or the second output end 36b can be used as a modulation light signal. In the following description, it is assumed that the output light signal from the first output end 36a is used as the modulation light signal.

When the light waveguides of the Mach-Zehnder optical modulator 10 are manufactured, manufacture variation may occur in the width and the length of the light waveguides in no small part, and the light path lengths of the first light waveguide 32a and the second light waveguide 32b may deviate from a preset value. Thereby, the phase difference between the lights having passed through the first light waveguide 32a and the second light waveguide 32b may deviate from a preset value. A circuit performing the phase adjustment in order to adjust such deviation or shift of the phase difference is the phase adjustment circuit 12.

The phase adjustment circuit 12 applies a DC voltage which is a phase control signal to each phase adjustment electrode 40, changes the refractive index of the core 20 in the first light waveguide 32a and the second light waveguide 32b, and changes the phases of the lights propagated in the first light waveguide 32a and the second light waveguide 32b to perform the phase adjustment. Specifically, the phase adjustment circuit 12 performs a feedback control of the DC voltage applied to each phase adjustment electrode 40, based on light intensity detected with each light intensity detection electrode 44. When the phase difference between the lights having passed through the first light waveguide 32a and the second light waveguide 32b alternately repeats $+\pi/2$ and $-\pi/2$, the intensity of the light output from the first output end 36a and the intensity of the light output from the second output end 36b are the same as each other at constant time intervals. Therefore, the phase adjustment circuit 12 adjusts the DC voltage to be applied to each phase adjustment electrode 40 so that the light intensity detected with the light intensity detection electrode 44 of the first output light waveguide 38a and the light intensity detected with the light intensity detection electrode 44 of the second output light waveguide 38b are the same as each other. Thereby, the phase difference between the lights having passed through the first light waveguide 32a and the second light waveguide 32b can alternately repeat $+\pi/2$ and $-\pi/2$, and the deviation or shift of the phase difference by the manufacture variation can be corrected. In such a phase control, a control by current injection can be also performed in addition to the above-mentioned control by the DC voltage. Moreover, a heater is provided on the first light waveguide 32a and the second light waveguide 32b, and such a phase control may be performed by controlling a temperature of the heater.

Figure 3:
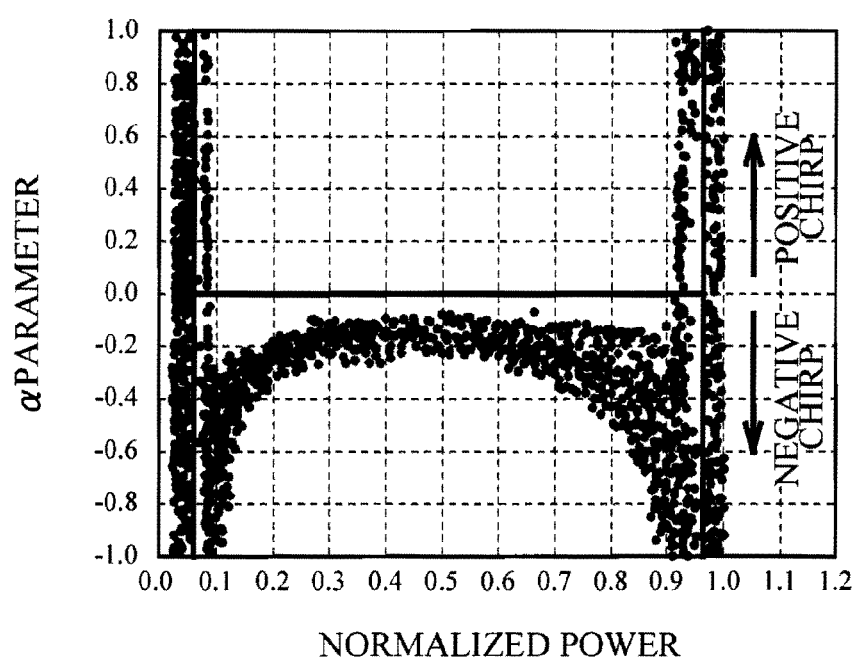
FIG. 3 is a diagram illustrating a measurement result of chirp waveforms of the optical modulation apparatus according to the comparative example 1.

Here, a detailed description will be given of a chirp characteristic of the optical modulation apparatus according to the comparative example 1. FIG. 3 is a diagram illustrating a measurement result of chirp waveforms of the optical modulation apparatus according to the comparative example 1. Although it is ideal that a zero-chirp characteristic (a solid line in FIG. 3) in which an a parameter is 0 is illustrated, a negative chirp characteristic in which the a parameter is shifted to a negative side is illustrated in the optical modulation apparatus according to the comparative example 1, as illustrated in FIG. 3.

Figure 4A:
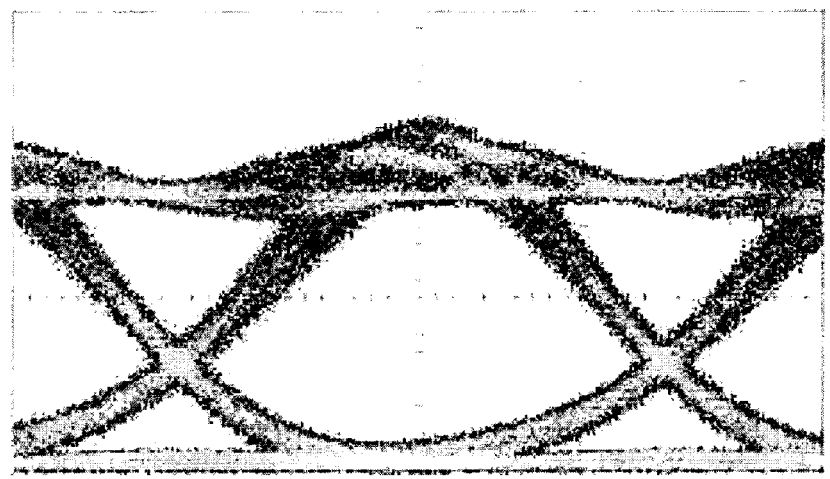
FIG. 4A is a diagram illustrating a measurement result of fiber-transmission waveforms when an optical fiber with a positive dispersion is connected to the optical modulation apparatus according to the comparative example 1.
Figure 4B:
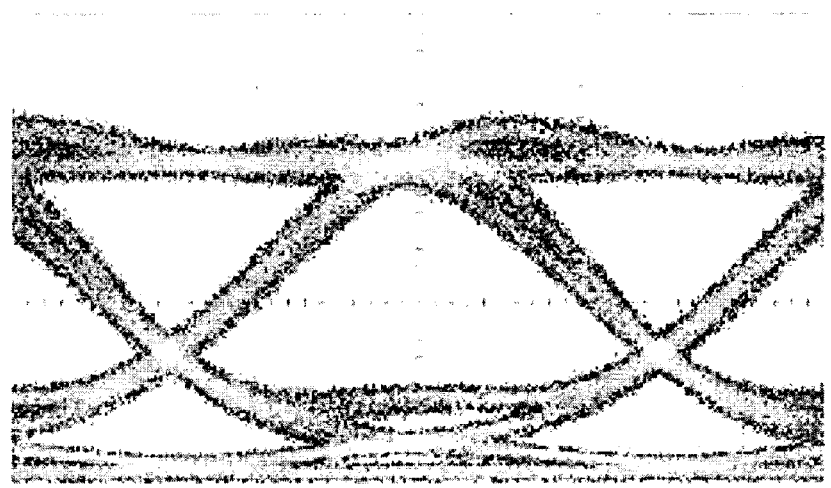
FIG. 4B is a diagram illustrating a measurement result of fiber-transmission waveforms when an optical fiber with a negative dispersion is connected to the optical modulation apparatus according to the comparative example 1.

FIG. 4A is a diagram illustrating a measurement result of fiber transmission waveforms when an optical fiber with the fiber-dispersion of a positive dispersion (+800 ps/nm) is connected to the optical modulation apparatus according to the comparative example 1. FIG. 4B is a diagram illustrating a measurement result of fiber-transmission waveforms when an optical fiber with the fiber-dispersion of a negative dispersion (−800 ps/nm) is connected to the optical modulation apparatus according to the comparative example 1. Here, the measurement is performed on the conditions that the light having a waveform of 1560 nm is guided, the DV bias voltage of −5.6V is applied to each modulation electrode 42, the DV voltage of −5.7V is applied to the phase adjustment electrode 40 of the second light waveguide 32b, and no voltage is applied to the phase adjustment electrode 40 of the first light waveguide 32a.

It is understood that the waveform distortions by the fiber-dispersion when the fiber-dispersion is the positive dispersion and the negative dispersion are asymmetrical, as illustrated in FIGS. 4A and 4B. It is considered as one of the central causes of the asymmetry that a change of the phase to the modulation voltage applied to each modulation electrode 42 is not linear. In the waveform of the negative dispersion, a zero level rises, and hence the dispersion penalty of the negative dispersion is easily larger than that of the positive dispersion. For example, whereas the dispersion penalty of the positive dispersion is 0 dB or less, the dispersion penalty of the negative dispersion may be 1.35 dB or less.

As described above, when the light waveguides of the Mach-Zehnder optical modulator 10 are manufactured, manufacture variation may occur in the width and the length of the light waveguides, and a branching ratio of the MMI in no small part. When the manufacture variation occurs in the width and the length of the light waveguides, the phase difference between the lights propagated in the first light waveguide 32a and the second light waveguide 32b deviates from a preset value. It is assumed that the shift of the phase difference by the manufacture variation is an initial phase difference $\Delta\Phi_{OS}$. It is considered that such variations of the branching ratio of the MMI and the initial phase difference $\Delta\Phi_{OS}$ by the manufacture variation also have an effect on the negative chirp characteristic as illustrated in FIG. 3, and an asymmetric diversity of the transmission waveforms of the positive dispersion and the negative dispersion as illustrated in FIGS. 4A and 4B.

In order to study that the variations of the branching ratio of the MMI and the initial phase difference $\Delta\Phi_{OS}$ have an effect on the chirp waveform characteristics and the transmission waveforms, a simulation has been performed about optical modulation apparatus according to the comparative example 1. The simulation has been performed on the conditions that the initial phase difference $\Delta\Phi_{OS}$ is 0.85π, the branching ratio γ of the lights to the first light waveguide 32a by the first MMI 30 is 0.45, the phase difference Δτ of the differential signal applied to each modulation electrode 42 is 5 psec, the light having a waveform of 1565 nm is guided, the DV bias voltage of −5.6V is applied to each modulation electrode 42, and the DV voltage of −5.7V is applied to the phase adjustment electrode 40 of the second light waveguide 32b.

Figure 5:
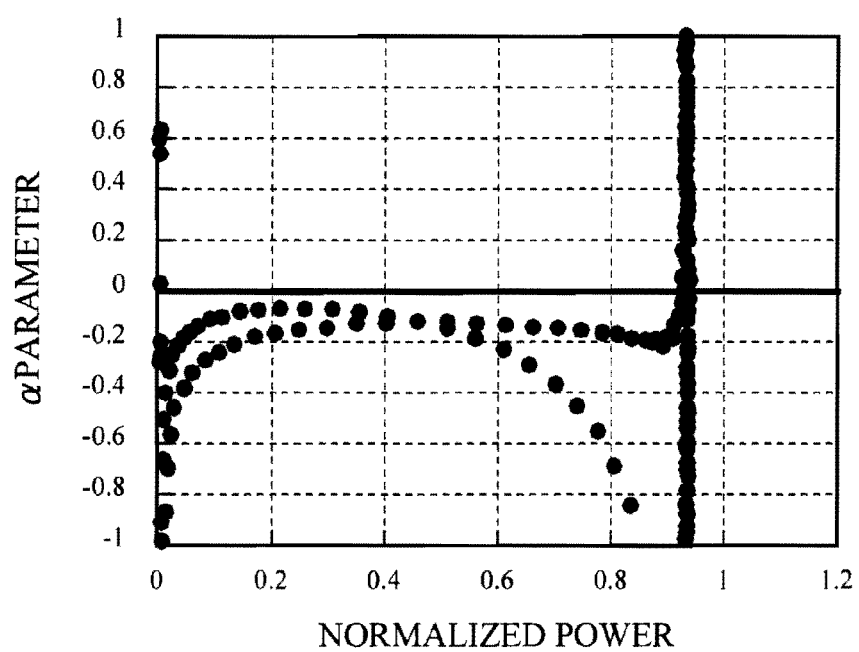
FIG. 5 is a diagram illustrating a simulation result of chirp waveforms of the optical modulation apparatus according to the comparative example 1.
Figure 6A:
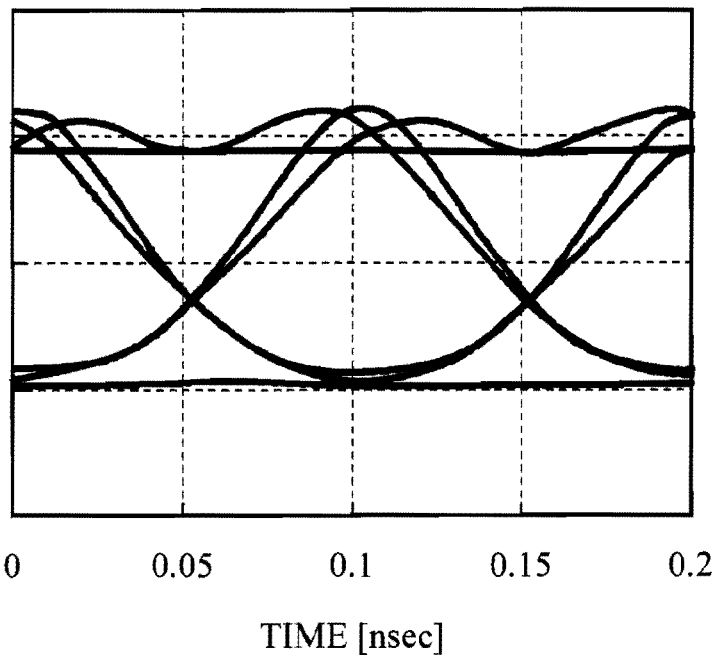
FIG. 6A is a diagram illustrating a simulation result of fiber-transmission waveforms when the optical fiber with the positive dispersion is connected to the optical modulation apparatus according to the comparative example 1.
Figure 6B:
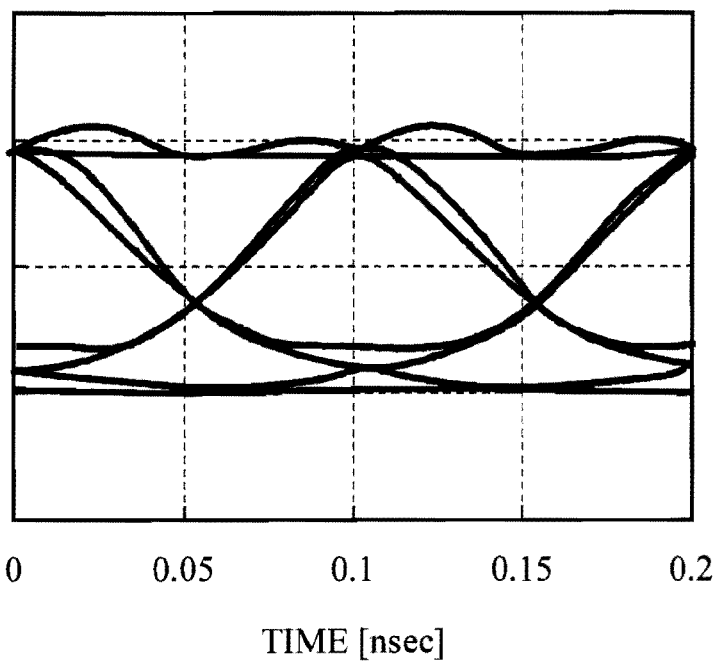
FIG. 6B is a diagram illustrating a simulation result of fiber-transmission waveforms when the optical fiber with the negative dispersion is connected to the optical modulation apparatus according to the comparative example 1.

FIG. 5 illustrates a simulation result of the chirp waveforms. FIG. 6A illustrates a simulation result of fiber-transmission waveforms when the optical fiber with the fiber-dispersion of the positive dispersion (+800 ps/nm) is connected to the optical modulation apparatus. FIG. 6B illustrates a simulation result of fiber-transmission waveforms when the optical fiber with the fiber-dispersion of the negative dispersion (−800 ps/nm) is connected to the optical modulation apparatus. It can be understood that the chirp waveforms and the fiber-transmission waveforms illustrated in FIGS. 5, 6A and 6B indicate the same results as the measurement results illustrated in FIGS. 3, 4A and 4B. Thereby, it can be understood that the variations of the branching ratio of the MMI and the initial phase difference $\Delta\Phi_{OS}$ have an effect on the chirp waveforms and the fiber-transmission waveforms.

Thus, the variations of the branching ratio of the MMI and the initial phase difference $\Delta\Phi_{OS}$ by the manufacture variation have an effect on the chirp waveforms and the fiber-transmission waveforms. The manufacture variation occurs in no small part, and hence a difference occurs between the dispersion penalties according to whether the optical fiber to be connected has the positive dispersion or the negative dispersion. For example, when the optical fiber with the negative dispersion is connected to the optical modulation apparatus, the dispersion penalty may rise. Therefore, to solve the problem, a description will be given of an example in which the dispersion penalty can be reduced even when the optical fiber with any of the positive dispersion or the negative dispersion is connected to the optical modulation apparatus.

First Embodiment

FIG. 7 is a schematic top view of the optical modulation apparatus according to a first embodiment. As illustrated in FIG. 7, the optical modulation apparatus according to the first embodiment mainly includes the Mach-Zehnder optical modulator 10, the phase adjustment circuit 12, the drive circuit 14, a phase shift control circuit 50, and a signal polarity reversal circuit 52.

In the Mach-Zehnder optical modulator 10, phase shift electrodes 54 are provided on the first light waveguide 32a and the second light waveguide 32b, respectively. Since other configurations of the Mach-Zehnder optical modulator 10 are the same as those of the Mach-Zehnder optical modulator 10 illustrated in the comparative example 1 of FIG. 1, a description thereof is omitted.

The DC voltage of a given value from the phase shift control circuit 50 is applied to any one of the phase shift electrodes 54, and the DC voltage is not applied to another one. When the DC voltage is applied to any one of the phase shift electrodes 54, a refractive index of the core 20 changes in the first light waveguide 32a and the second light waveguide 32b, and the phases of the lights passing through the first light waveguide 32a and the second light waveguide 32b change. Therefore, when the DC voltage of the given value is applied to any one of the phase shift electrodes 54, and the DC voltage is not applied to another one, a phase shift according to the phase difference occurs in the first light waveguide 32a and the second light waveguide 32b.

One end of an optical fiber 56 is connected to the first output end 36a of the Mach-Zehnder optical modulator 10, and a light receiver 58 is connected to another end of the optical fiber 56. The output light signal used as the modulation light signal is output from the first output end 36a, and the light receiver 58 receives the output light signal. Then, the light receiver 58 measures an error rate and the fiber-transmission waveform of the output light signal.

The drive circuit 14 applies the modulation voltage to the modulation electrodes 42 provided on the first light waveguide 32a and the second light waveguide 32b. The DC bias voltage is applied to the modulation voltage applied to the modulation electrodes 42. The drive circuit 14 inputs a modulation signal to be output to the modulation electrode 42 of the first light waveguide 32a, and a modulation signal to be output to the modulation electrode 42 of the second light waveguide 32b, as the differential signal.

The phase adjustment circuit 12 controls a value of the DC voltage, which is a phase control signal, to be applied to each phase adjustment electrode 40 based on the intensity of the light detected with each light intensity detection electrode 44, and performs the phase adjustment for correcting a shift from a setting value of the phase difference between the lights having passed through the first light waveguide 32a and the second light waveguide 32b. Specifically, the phase adjustment circuit 12 controls the DC voltage to be applied to each phase adjustment electrode 40 so that average intensities of the lights detected with the light intensity detection electrodes 44 are the same as each other, and performs the phase adjustment for correcting the shift from the setting value of the phase difference.

The phase shift control circuit 50 detects the error rate measured with the light receiver 58, and switches values of the DC voltages, which are the phase control signals, applied to the phase shift electrodes 54 based on the error rate. Specifically, since the phase shift control circuit 50 applies the given DC voltage to any one of the phase shift electrodes 54 and does not apply the DC voltage to another one, the phase shift control circuit 50 switches one of the phase shift electrodes 54 to which the given DC voltage is applied. Thereby, the phase shift according to the value of the DC voltage occurs in the first light waveguide 32a or the second light waveguide 32b.

The signal polarity reversal circuit 52 detects the error rate measured with the light receiver 58, and reverses a signal polarity of the differential signal to be output from the drive circuit 14, based on the error rate. That is, the reversal of the signal polarity of the differential signal by the signal polarity reversal circuit 52 is performed in conjunction with the switching of the values of the DC voltages applied to one of the phase shift electrodes 54 and another one of the phase shift electrodes 54 by the phase shift control circuit 50.

Here, definitions are given as follows. A shift of the phase difference caused by the manufacture variation of the light waveguides is defined as an initial phase difference $\Delta\Phi_{OS}$. Since the given DC voltage is one of the phase shift electrodes 54 and no DC voltage is another one of the phase shift electrodes 54, the phase shift occurs in the first light waveguide 32a or the second light waveguide 32b. An amount of the phase shift caused by the first light waveguide 32a or the second light waveguide 32b is defined as $\Phi_{PS}$. An amount of the phase shift caused by the DC voltage applied to the phase adjustment electrode 40 of the first light waveguide 32a is defined as $\Phi_{DC1A}$. An amount of the phase shift caused by the DC voltage applied to the phase adjustment electrode 40 of the second light waveguide 32b is defined as $\Phi_{DC2A}$. The DC bias voltage is applied to the modulation voltage to be applied to each modulation electrode 42. An amount of the phase shift caused by the DC bias voltage applied to the modulation electrode 42 of the first light waveguide 32a is defined as $\Phi_{DC1B}$. An amount of the phase shift caused by the DC bias voltage applied to the modulation electrode 42 of the second light waveguide 32b is defined as $\Phi_{DC2B}$. Since values of the DC bias voltages to be applied to the modulation electrodes 42 with the drive circuit 14 are generally the same as each other, the amount $\Phi_{DC1B}$ of the phase shift is the same as the amount $\Phi_{DC2B}$ of the phase shift (i.e., $\Phi_{DC1B}=\Phi_{DC2B}$).

Figure 8:
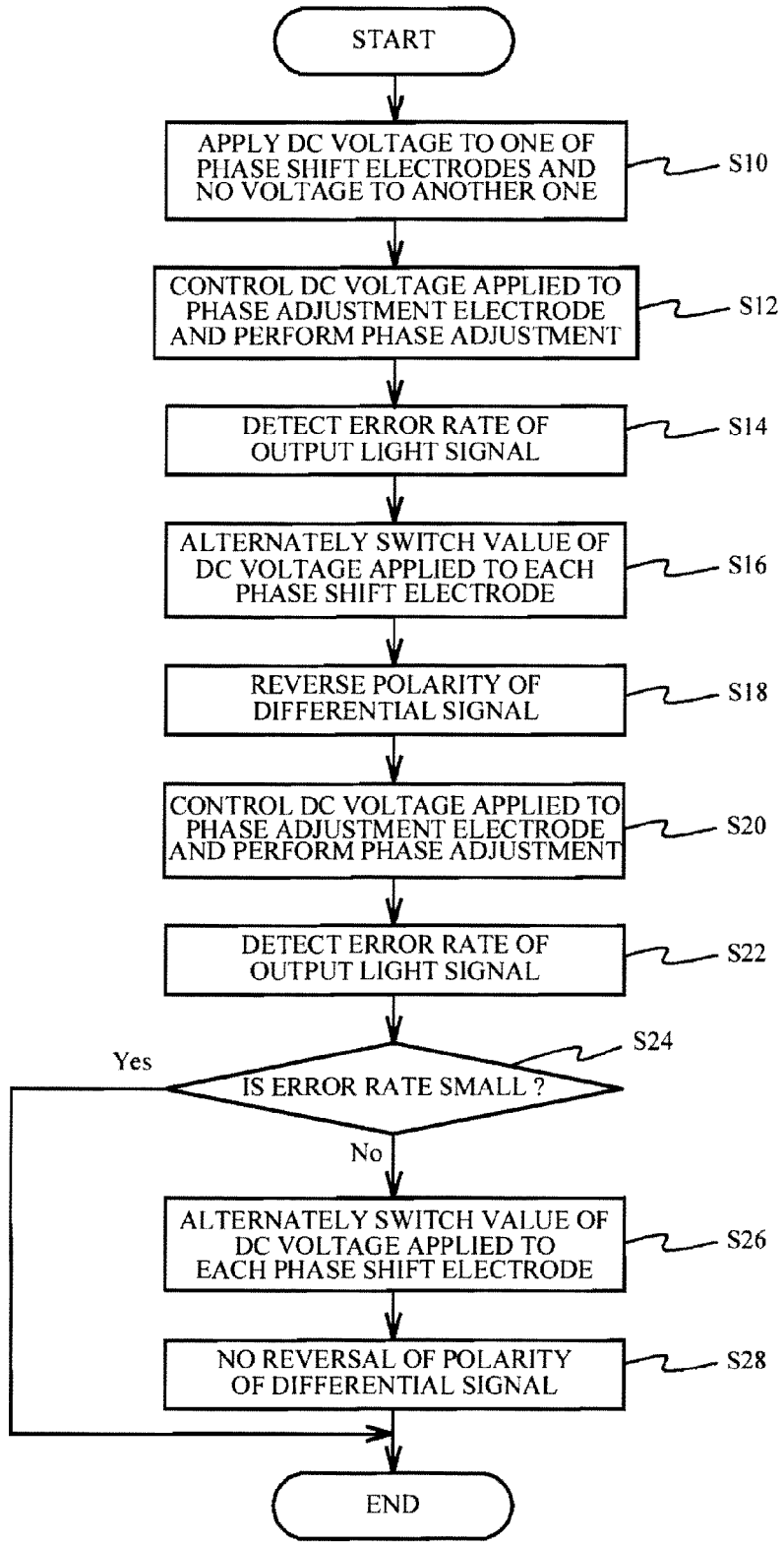
FIG. 8 is a flowchart illustrating the control of the optical modulation apparatus according to the first embodiment.

FIG. 8 is a flowchart illustrating the control of the optical modulation apparatus according to the first embodiment. As illustrated in FIG. 8, the phase shift control circuit 50 first applies the given DC voltage to one of the phase shift electrodes 54 and no DC voltage to another one of the phase shift electrodes 54 so that the phase shift of $-\pi/2$ occurs in the first light waveguide 32a (step S10).

Next, the phase adjustment circuit 12 controls the DC voltage applied to each phase adjustment electrode 40 so that the light intensities detected with the light intensity detection electrodes 44 are the same as each other, and performs the phase adjustment for correcting the shift from the setting value of the phase difference between the lights having passed through the first light waveguide 32a and the second light waveguide 32b (step S12). Next, the phase shift control circuit 50 and the signal polarity reversal circuit 52 detect the error rate measured with the light receiver 58 (step S14).

Next, the phase shift control circuit 50 alternately switches the value of the DC voltage applied to each phase shift electrode 54 so that the phase shift of $-\pi/2$ occurs in the second light waveguide 32b (step S16). Specifically, the phase shift control circuit 50 stops applying the given DC voltage to one of the phase shift electrodes 54 so as not to applying the given DC voltage thereto, and applies the given DC voltage to another one of the phase shift electrodes 54 to which the given DC voltage has not been applied. Next, the signal polarity reversal circuit 52 reverses the signal polarity of the differential signal to be output from the drive circuit 14 (step S18).

Next, the phase adjustment circuit 12 controls the DC voltage applied to each phase adjustment electrode 40 so that the light intensities detected with the light intensity detection electrodes 44 are the same as each other, and performs the phase adjustment for correcting the shift from the setting value of the phase difference between the lights having passed through the first light waveguide 32a and the second light waveguide 32b (step S20).

Figure 9:
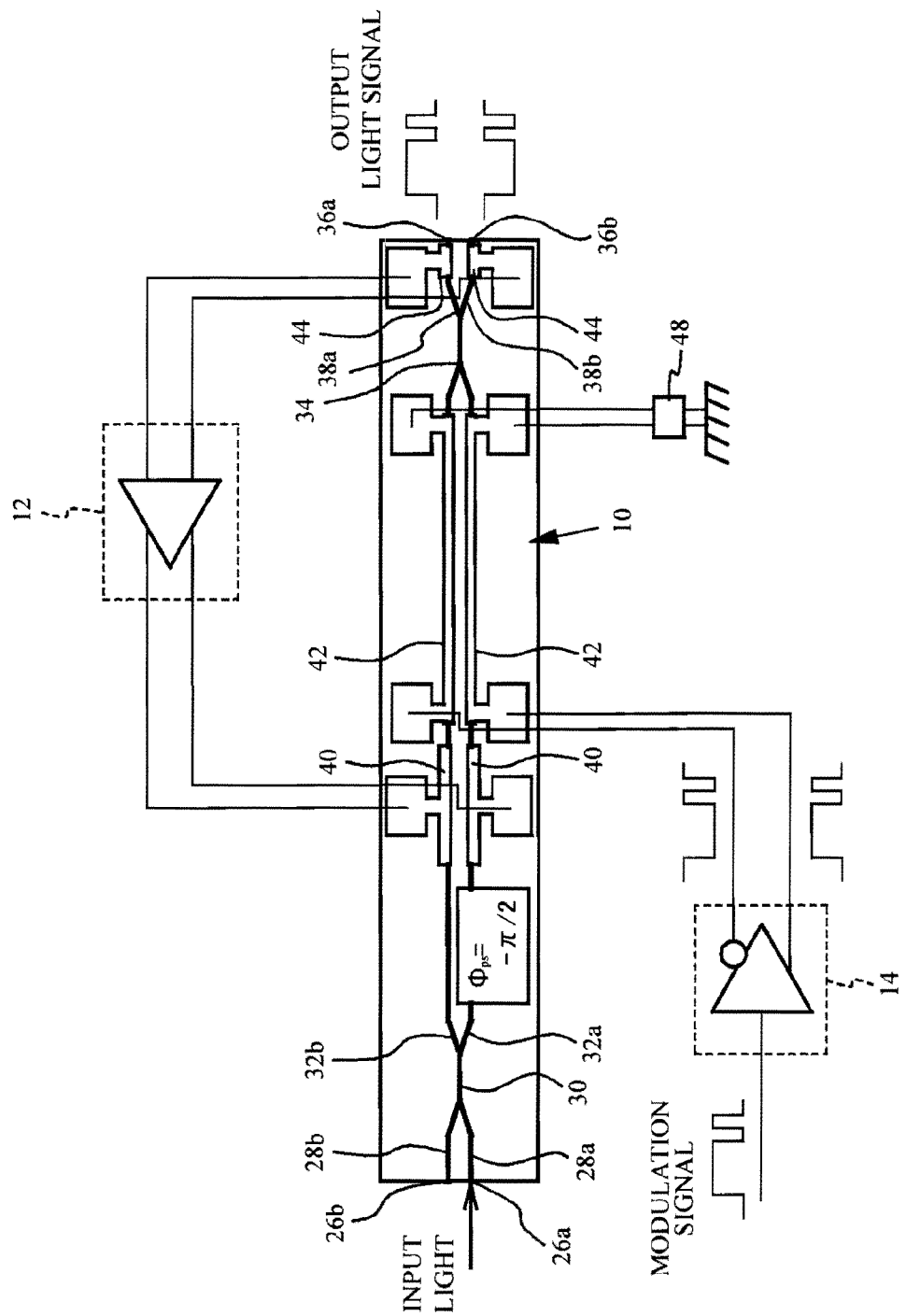
FIG. 9 is a schematic diagram illustrating a relationship between a logic of an output light signal and a logic of a modulation signal when a phase shift of $-\pi/2$ occurs in a first light waveguide.
Figure 10:
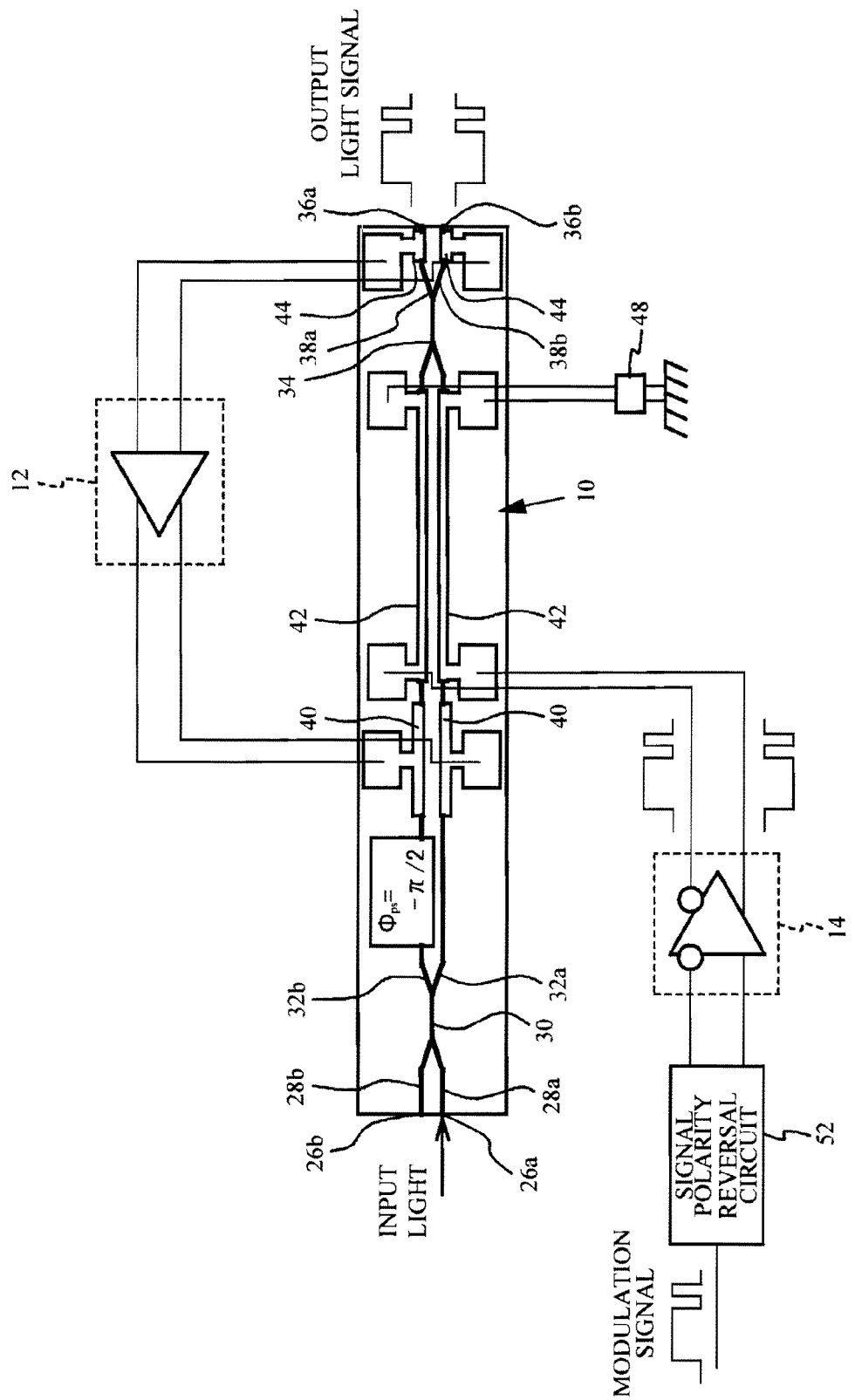
FIG. 10 is a schematic diagram illustrating a relationship between the logic of the output light signal and the logic of the modulation signal when the phase shift of $-\pi/2$ occurs in a second light waveguide and a polarity of a differential signal is reversed.

Here, a description will be given of a relationship between a logic of the output light signal and a logic of the modulation signal, with the use of FIGS. 9 and 10. FIG. 9 is a schematic diagram illustrating the relationship between the logic of the output light signal and the logic of the modulation signal when the phase shift of $-\pi/2$ occurs in the first light waveguide 32a. FIG. 10 is a schematic diagram illustrating the relationship between the logic of the output light signal and the logic of the modulation signal when the phase shift of $-\pi/2$ occurs in the second light waveguide 32b and the polarity of the differential signal is reversed.

When the phase shift of $-\pi/2$ occurs in the first light waveguide 32a, an amount $\Phi_{DC1}$ of the phase change caused by the DC voltage in the first light waveguide 32a can be expressed as "$\Phi_{DC1}=\Delta\Phi_{OS}+\Phi_{PS}+\Phi_{DC1A}+\Phi_{DC1B}=\Delta\Phi_{OS}-\pi/2+\Phi_{DC1A}+\Phi_{DC1B}$". Similarly, an amount $\Phi_{DC2}$ of the phase change caused by the DC voltage in the second light waveguide 32b can be expressed as "$\Phi_{DC2}=\Phi_{DC2A}+\Phi_{DC2B}$". Since the amount $\Phi_{DC1B}$ of the phase shift is the same as the amount $\Phi_{DC2B}$ of the phase shift (i.e., $\Phi_{DC1B}=\Phi_{DC2B}$) as described above, and a difference between $\Phi_{DC1}$ and $\Phi_{DC2}$ can be expressed as "$\Phi_{DC1}-\Phi_{DC2}=\Delta\Phi_{OS}-\pi/2+\Phi_{DC1A}-\Phi_{DC2A}$".

On the contrary, when the phase shift of $-\pi/2$ occurs in the second light waveguide 32b, an amount $\Phi_{DC1}$ of the phase change caused by the DC voltage in the first light waveguide 32a can be expressed as "$\Phi_{DC1}=\Delta\Phi_{OS}+\Phi_{DC1A}+\Phi_{DC1B}$". Similarly, an amount $\Phi_{DC2}$ of the phase change caused by the DC voltage in the second light waveguide 32b can be expressed as "$\Phi_{DC2}=\Phi_{PS}+\Phi_{DC2A}+\Phi_{DC2B}=-\pi/2+\Phi_{DC2A}+\Phi_{DC2B}$". Therefore, a difference between $\Phi_{DC1}$ and $\Phi_{DC2}$ can be expressed as "$\Phi_{DC1}-\Phi_{DC2}=\Delta\Phi_{OS}+\Phi_{DC1A}-\Phi_{DC2A}+\pi/2$".

Thus, the difference "$\Phi_{DC1}-\Phi_{DC2}$" between $\Phi_{DC1}$ and $\Phi_{DC2}$ shifts by π according to whether the phase shift of $-\pi/2$ occurs in the first light waveguide 32a or the second light waveguide 32b. As illustrated in the comparative example 1, by the modulation voltage applied to each modulation electrode 42, the phase difference of any one of $-\pi/2$ and $+\pi/2$ is alternately added to the lights having passed through the first light waveguide 32a and the second light waveguide 32b. From this, when the phase shift of $-\pi/2$ occurs in the first light waveguide 32a and the difference "$\Phi_{DC1}-\Phi_{DC2}$" is assumed as $-\pi/2$, the logic of the output light signal from the first output end 36a used as the modulation light signal corresponds with that of the modulation signal, as illustrated in FIG. 9.

On the contrary, when the phase shift of $-\pi/2$ occurs in the second light waveguide 32b, the phase shifts by π, compared to the case where the phase shift of $-\pi/2$ occurs in the first light waveguide 32a, and hence the difference "$\Phi_{DC1}-\Phi_{DC2}$" is $+\pi/2$. In such a case, the logic of the output light signal output from the first output end 36a is reversed against the logic of the modulation signal. By reversing the polarity of the differential signal to be output from the drive circuit 14, the logic of the output light signal output from the first output end 36a can correspond with the logic of the modulation signal, as illustrated in FIG. 10.

Therefore, the optical modulation apparatus according to the first embodiment can make the logic of the output light signal output from the first output end 36a correspond with the logic of the modulation signal.

Referring again to FIG. 8, the phase shift control circuit 50 and the signal polarity reversal circuit 52 detect an error rate measured with the light receiver 58 (step S22).

Figure 11A:
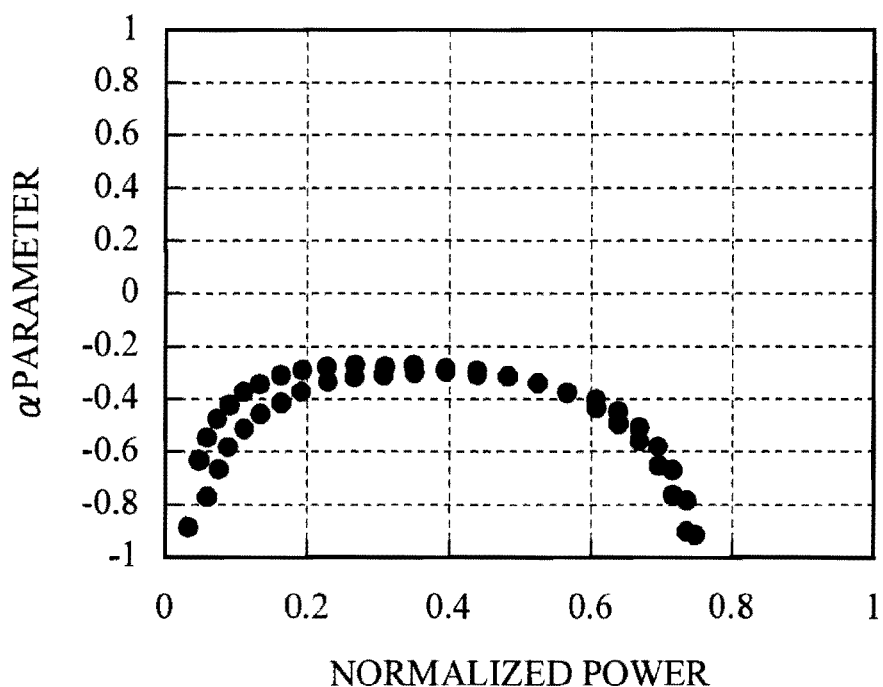
FIG. 11A is a diagram illustrating a simulation result of chirp waveforms when the phase shift occurs in the first light waveguide and the polarity of the differential signal is not reversed.
Figure 11B:
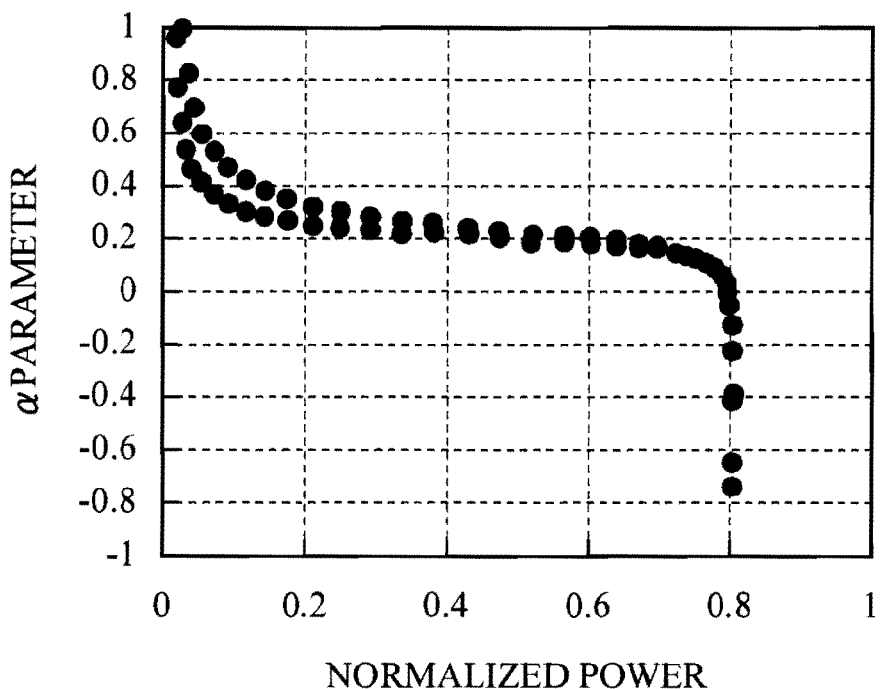
FIG. 11B is a diagram illustrating a simulation result of chirp waveforms when the phase shift occurs in the second light waveguide and the polarity of the differential signal is reversed.

Here, it is explained that the error rate detected in step S22 differs from the error rate detected in step S14. FIG. 11A illustrates a simulation result of chirp waveforms when the phase shift of $-\pi/2$ occurs in the first light waveguide 32a and the polarity of the differential signal from the drive circuit 14 is not reversed. FIG. 11B illustrates a simulation result of chirp waveforms when the phase shift of $-\pi/2$ occurs in the second light waveguide 32b and the polarity of the differential signal from the drive circuit 14 is reversed. The simulation has been performed under the following conditions. The lengths of the first light waveguide 32a and the second light waveguide 32b corresponding to portions on which the modulation electrodes 42 are provided are set to 1.5 m. The lengths of the first light waveguide 32a and the second light waveguide 32b corresponding to portions on which the phase adjustment electrodes 40 are provided are set to 0.6 mm. The initial phase difference $\Delta\Phi_{OS}$ is set to $-0.99\pi$. The branching ratio of the light to the first light waveguide 32a of the first MMI 30 is set to 0.45. The light having a waveform of 1565 nm is guided. The DV bias voltage applied to each modulation electrode 42 is set to $-6V$. An extinction ratio is set to less than 26 dB.

It is understood that, when the polarity of the differential signal from the drive circuit 14 is reversed, the chirp waveforms are also reversed, as illustrated in FIGS. 11A and 11B. That is, the negative chirp characteristics are indicated as illustrated in FIG. 11A before the polarity of the differential signal is reversed. On the contrary, the positive chirp characteristics are indicated as illustrated in FIG. 11B by reversing the polarity of the differential signal.

Figure 12A:
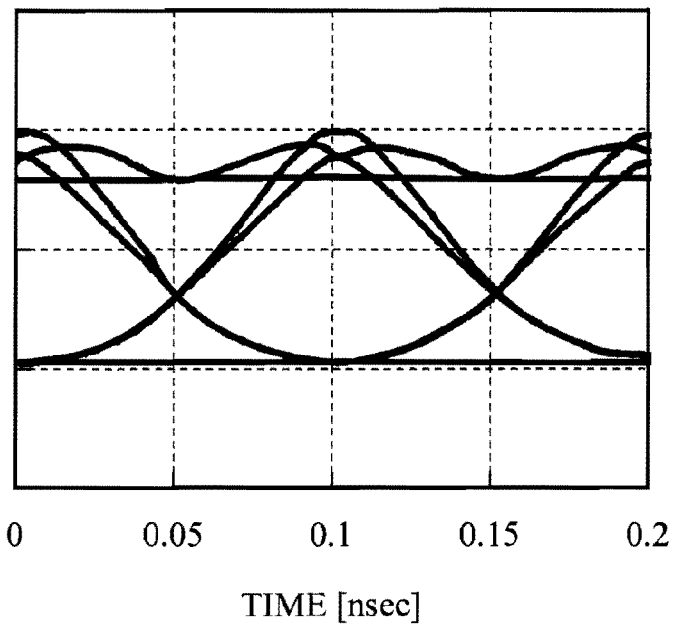
FIG. 12A is a diagram illustrating a simulation result of fiber-transmission waveforms when the polarity of the differential signal is not reversed and the optical fiber has the positive dispersion.
Figure 12B:
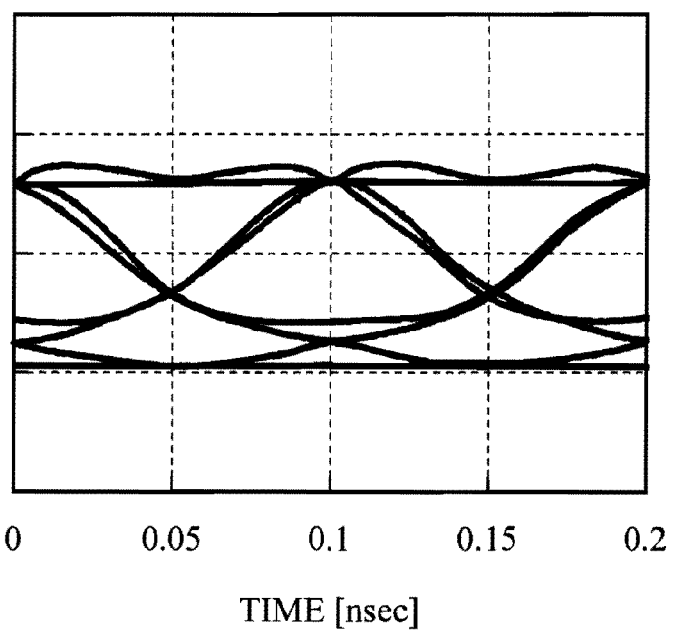
FIG. 12B is a diagram illustrating a simulation result of fiber-transmission waveforms when the polarity of the differential signal is not reversed and the optical fiber has the negative dispersion.
Figure 13A:
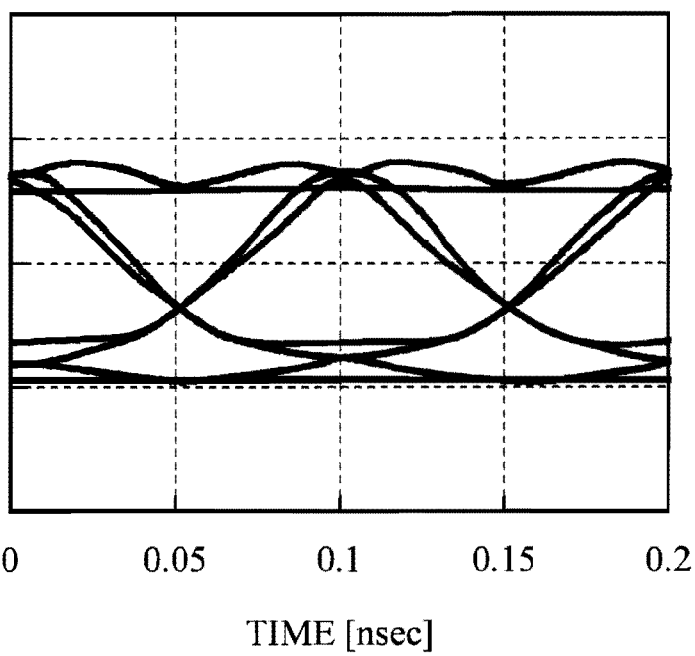
FIG. 13A is a diagram illustrating a simulation result of fiber-transmission waveforms when the polarity of the differential signal is reversed and the optical fiber has the positive dispersion.
Figure 13B:
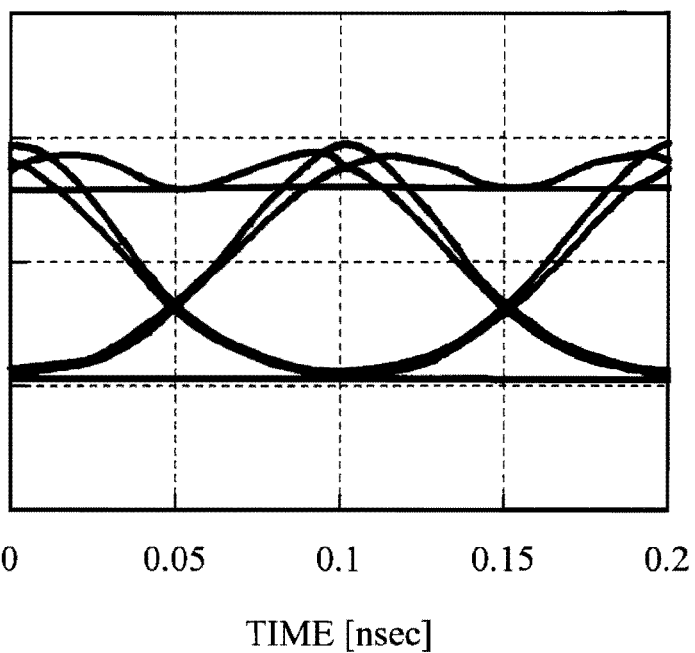
FIG. 13B is a diagram illustrating a simulation result of fiber-transmission waveforms when the polarity of the differential signal is reversed and the optical fiber has the negative dispersion.

Next, it is explained how the fiber-transmission waveforms change with respect to the case where the polarity of the differential signal is reversed and the case where the polarity of the differential signal is not reversed. FIGS. 12A and 12B illustrate the case where the polarity of the differential signal is not reversed. FIG. 12A illustrates a simulation result of the fiber-transmission waveforms when the optical fiber 56 has the positive dispersion (+800 ps/nm). FIG. 12B illustrates a simulation result of the fiber-transmission waveforms when the optical fiber 56 has the negative dispersion (−800 ps/nm). FIGS. 13A and 13B illustrate the case where the polarity of the differential signal is reversed. FIG. 13A illustrates a simulation result of the fiber-transmission waveforms when the optical fiber 56 has the positive dispersion (+800 ps/nm). FIG. 13B illustrates a simulation result of the fiber-transmission waveforms when the optical fiber 56 has the negative dispersion (−800 ps/nm).

In the case where the polarity of the differential signal is not reversed as illustrated in FIGS. 12A and 12B, a clear eye pattern is indicated when the optical fiber 56 has the positive dispersion. On the other hand, the eye pattern is destroyed and the zero level rises when the optical fiber 56 has the negative dispersion. On the contrary, in the case where the polarity of the differential signal is reversed as illustrated in FIGS. 13A and 13B, the eye pattern is destroyed and the zero level rises when the optical fiber 56 has the positive dispersion. On the other hand, a clear eye pattern is indicated when the optical fiber 56 has the negative dispersion.

Thus, regardless of whether the dispersion of the optical fiber 56 is the positive dispersion or the negative dispersion, the eye pattern before the polarity of the differential signal is reversed differs from the eye pattern after the polarity of the differential signal is reversed. Therefore, the error rate detected in step S22 has a different value from the error rate detected in step S14.

Referring again to FIG. 8, the phase shift control circuit 50 and the signal polarity reversal circuit 52 determine whether the error rate detected in step S22 is smaller than the error rate detected in step S14 (step S24). When it is determined that the error rate detected in step S22 is smaller than the error rate detected in step S14 (YES), the phase shift control circuit 50 maintains the DC voltage applied to each phase shift electrode 54 as it stands, and the signal polarity reversal circuit 52 maintains the polarity of the differential signal as it stands. When it is determined that the error rate detected in step S22 is larger than the error rate detected in step S14 (NO), the phase shift control circuit 50 mutually switches the values of the DC voltages applied to the phase shift electrode 54 (step S26), and the signal polarity reversal circuit 52 does not reverse the polarity of the differential signal to be output from the drive circuit 14 (step S28).

As described above, the optical modulation apparatus according to the first embodiment includes the phase shift control circuit 50 that switches the phase control signal to be output to one of the phase shift electrodes 54 of the first light waveguide 32a and the second light waveguide 32b and the phase control signal to be output to another one of the phase shift electrodes 54, and changes phases of the lights propagated in the first light waveguide 32a and the second light waveguide 32b. For example, the optical modulation apparatus according to the first embodiment includes the phase shift control circuit 50 that switches the value of the DC voltage applied to one of the phase shift electrodes 54 and the value of the DC voltage applied to another one of the phase shift electrodes 54, and changes phases of the lights propagated in the first light waveguide 32a and the second light waveguide 32b. In addition, the optical modulation apparatus according to the first embodiment includes the signal polarity reversal circuit 52 that reverses the polarity of the differential signal to be output from the drive circuit 14. As illustrated in FIG. 8, this makes it possible to switch the phase control signal to be output to one of the phase shift electrodes 54 and the phase control signal to be output to another one of the phase shift electrodes 54 and reverse the polarity of the differential signal so that the error rate of the output light signal used as the modulation light signal, measured with the light receiver 58 becomes small. Since the phase control signals to be output are mutually switched and the polarity of the differential signal is reversed so that the error rate becomes small, the fiber-transmission waveforms illustrated in FIG. 12A can be obtained when the optical fiber 56 has the positive dispersion, and the fiber-transmission waveforms illustrated in FIG. 13B can be obtained when the optical fiber 56 has the negative dispersion. Therefore, it is possible to reduce the dispersion penalty regardless of whether the optical fiber 56 has the positive dispersion or the negative dispersion. In addition, it is possible to make the logic of the output light signal used as the modulation light signal correspond with the logic of the modulation signal, as illustrated in FIGS. 9 and 10.

As described above, it is desirable that the reversal of the polarity of the differential signal to be output from the drive circuit 14 by the signal polarity reversal circuit 52 is performed in conjunction with the switching of the phase control signals to be output to one of the phase shift electrodes 54 and another one of the phase shift electrodes 54 by the phase shift control circuit 50. In addition, it is more desirable that the reversal of the polarity of the differential signal and the switching of the phase control signals operate at the same time. Thereby, it is possible to make the logic of the output light signal used as the modulation light signal correspond with the logic of the modulation signal.

In the first embodiment, the switching of the phase control signals by the phase shift control circuit 50 and the reversal of the polarity of the differential signal by the signal polarity reversal circuit 52 are performed based on the error rate after the output light signal used as the modulation light signal is transmitted through the optical fiber 56. However, the first embodiment is not limited to this. For example, the mutual switching of the phase control signals and the reversal of the polarity of the differential signal may be performed based on the fiber-transmission waveforms of the output light signal. However, when the switching of the phase control signals and the reversal of the polarity of the differential signal are performed based on the error rate, it is possible to restrain the logic of the output light signal used as the modulation light signal from reversing against the logic of the modulation signal.

In the first embodiment, the phase shift of $-\pi/2$ occurs in the first light waveguide 32a and the second light waveguide 32b by the phase shift control circuit 50. However, the first embodiment is not limited to this. The phase shift of $+\pi/2$ may occur in the first light waveguide 32a and the second light waveguide 32b. That is, the phase shift control circuit 50 may change phases of the lights so as to add a phase difference of $-\pi/2$ or $+\pi/2$ to the lights propagated in the first light waveguide 32a and the second light waveguide 32b. When the phase shift occurring in the first light waveguide 32a or the second light waveguide 32b is $-\pi/2$, the difference "$\Phi_{DC1}-\Phi_{DC2}$" shifts by $\pi$, compared to the case where the phase shift occurring in the first light waveguide 32a or the second light waveguide 32b is $+\pi/2$. Accordingly, if the logic of the output light signal used as the modulation light signal corresponds with the logic of the modulation signal when the phase shift is $-\pi/2$, the logics are opposed to each other when the phase shift is $+\pi/2$. However, since the polarity of the differential signal is properly reversed by the signal polarity reversal circuit 52, it is possible to make the logic of the output light signal used as the modulation light signal correspond with the logic of the modulation signal. For example, if the phase shift of $-\pi/2$ occurs in the first light waveguide 32a, and the logic of the output light signal corresponds with the logic of the modulation signal in a state where the polarity of the differential signal is not reversed, it is possible to, when the phase shift occurring in the first light waveguide 32a is $+\pi/2$, make the logic of the output light signal correspond with the logic of the modulation signal by reversing the polarity of the differential signal.

In the first embodiment, when the phase shift control circuit 50 outputs the phase control signal to any one of the phase shift electrodes 54 of the first light waveguide 32a and the second light waveguide 32b, the phase shift control circuit 50 does not output the phase control signal to another one of the phase shift electrodes 54. That is, when the DC voltage is applied to any one of the phase shift electrodes 54, no DC voltage is applied to another one of the phase shift electrodes 54. However, the first embodiment is not limited to this. If a given difference in potential is maintained between the values of the DC voltages applied to any one of the phase shift electrodes 54 and another one of the phase shift electrodes 54, bias voltages may be applied to the DC voltages.

In the first embodiment, a target value of a cross point of the output light signals output from the first output end 36a and the second output end 36b is 50%. However, the first embodiment is not limited to this. The target value of the cross point may be a value other than 50%.

In the first embodiment, the Mach-Zehnder optical modulator 10 includes the two input light waveguides, but is not limited to this. Even when the Mach-Zehnder optical modulator 10 includes a single input light waveguide, the same method as described above is applicable.

The present invention is not limited to the specifically described embodiments and variations but other embodiments and variations may be made without departing from the scope of the claimed invention.

What is claimed is:

1. An optical modulation apparatus, comprising:
   a Mach-Zehnder optical modulator having two light waveguides, two output light waveguides, and a join-and-branch portion located therebetween;
   a drive circuit configured to output a modulation signal to modulation electrodes provided respectively on the two light waveguides as a differential signal, the modulation signal modulating lights propagated in the two light waveguides;
   a phase adjustment circuit configured to control first phase control signals to be output to phase adjustment electrodes provided respectively on the two light waveguides, and adjust phases of lights propagated in the two light waveguides;
   a phase shift control circuit configured to switch second phase control signals to be output to phase shift electrodes provided respectively on the two light waveguides, and change phases of the lights propagated in the two light waveguides; and
   a signal polarity reversal circuit configured to reverse a polarity of the differential signal.

2. The optical modulation apparatus according to claim 1, wherein the reversal of the polarity of the differential signal by the signal polarity reversal circuit is performed in conjunction with the switching of the second phase control signals by the phase shift control circuit.

3. The optical modulation apparatus according to claim 2, wherein the phase shift control circuit switches the second phase control signals based on an error rate after an output light signal used as a modulation light signal output from one of the two output light waveguides is transmitted through an optical fiber, and the signal polarity reversal circuit reverses the polarity of the differential signal based on the error rate.

4. The optical modulation apparatus according to claim 2, wherein the phase shift control circuit switches the second phase control signals so as to make the error rate small, and the signal polarity reversal circuit reverses the polarity of the differential signal so as to make the error rate small.

5. The optical modulation apparatus according to claim 1, wherein the phase shift control circuit changes the phases of the lights propagated in the two light waveguides so as to add a phase difference of $-\pi/2$ or $+\pi/2$ to the lights propagated in the two light waveguides.

6. The optical modulation apparatus according to claim 1, wherein when the phase shift control circuit outputs the second phase control signal to one of the phase shift electrodes, the phase shift control circuit does not output the second phase control signal to another one of the phase shift electrodes.

7. The optical modulation apparatus according to claim 1, wherein the phase adjustment circuit controls the first phase control signal based on intensities of lights propagated in the two output light waveguides.

8. The optical modulation apparatus according to claim 1, wherein the second phase control signal applies a phase difference between the lights propagated in the two light waveguides.

9. The optical modulation apparatus according to claim 1, the two light waveguides, the two output light waveguides, and the join-and-branch portion are formed by semiconductor material.

10. The optical modulation apparatus according to claim 1, the two light waveguides, the two output light waveguides, and the join-and-branch portion are formed by InP based semiconductor material.

11. The optical modulation apparatus according to claim 1, the join-and-branch portion having a Multi Mode Interference structure.

12. A method for controlling an optical modulation apparatus, comprising:

switching, based on an error rate after an output light signal used as a modulation light signal output from one of two output light waveguides in a Mach-Zehnder optical modulator is transmitted through an optical fiber, phase control signals to be output to phase shift electrodes provided respectively on two light waveguides, the two light waveguides being connected to the two output light waveguides via a unit-and-branch portion;

changing the phase of lights propagated in the two light waveguides; and reversing, when a modulation signal for modulating the lights propagated in the two light waveguides is output to modulation electrodes provided respectively on the two light waveguides as a differential signal, the polarity of the differential signal to be output to the modulation electrodes in conjunction with the switching of the phase control signals.

* * * * *